United States Patent Office 2,740,740
Patented Apr. 3, 1956

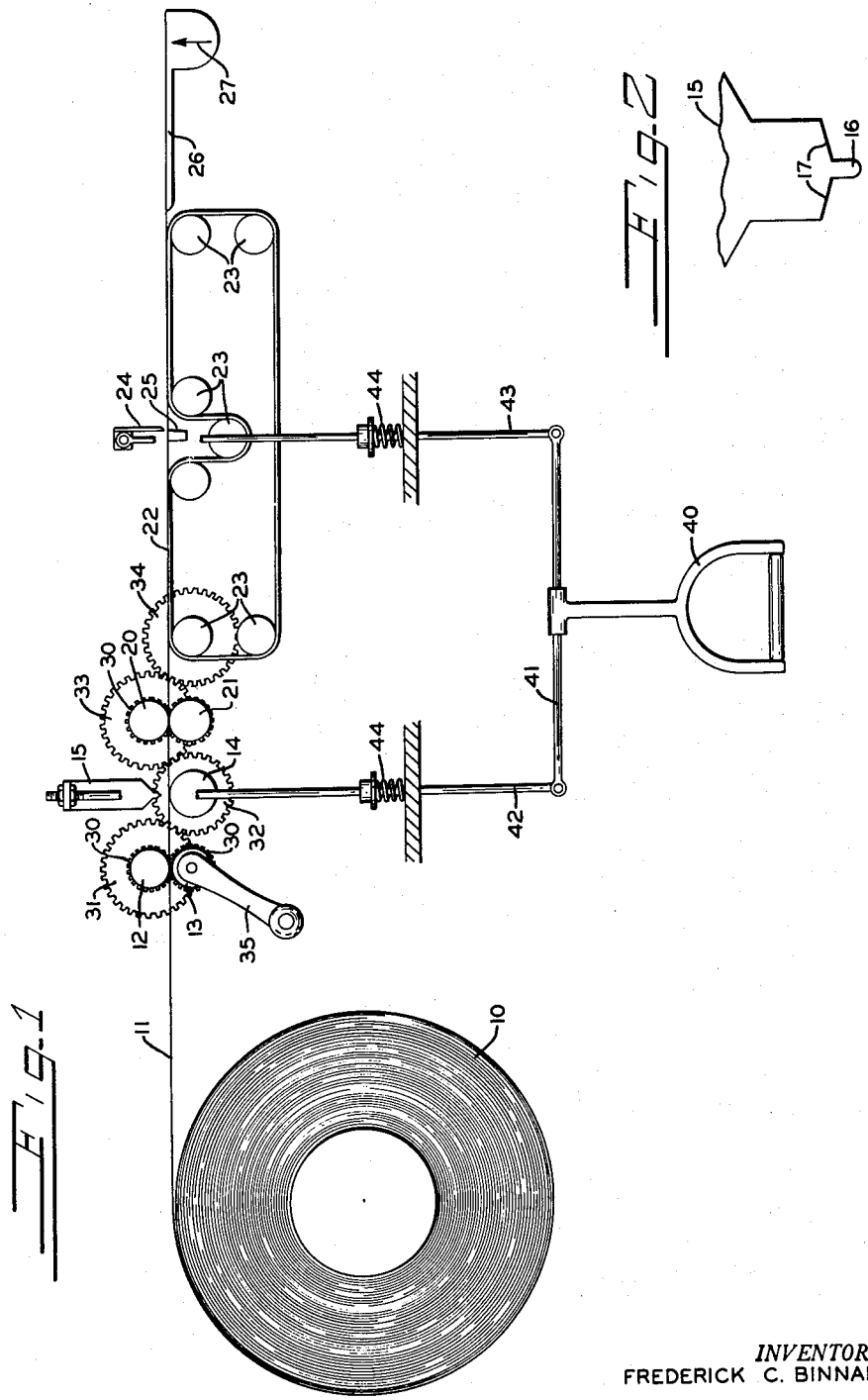

2,740,740

METHOD OF MAKING BAGS

Frederick C. Binnall, River Forest, Ill.

Application December 12, 1952, Serial No. 325,665

10 Claims. (Cl. 154—83)

This invention relates to a method of making bags from a web of thermoplastic film stock and, more particularly, to a novel procedure of welding and cutting the film stock whereby bags may be made more rapidly and more economically than by former methods.

The conventional method in use today for making bags from a continuous length of tubular, thermoplastic film stock consists of advancing the stock through a distance equal to the length of one bag, then dwelling for approximately three-quarters of a second during which time the material is sealed transversely of its length by a bar heated to about 300 to 350° F. At the same time that the material is welded by the heated bar, a knife is operated to cut off the material ¼ inch or so below the weld. The stock is again advanced through a distance equal to the length of one bag whereupon it is permitted to remain stationary again while another welding and cutting operation takes place. Thus, one bag is produced for each operation of the weld bar and knife. This method is slow and also wasteful since the excess film stock remaining beneath the seal has no utility and merely represents waste material.

To overcome these undesirable features of the prevailing method in use today for the manufacture of plastic bags, I have devised a method whereby two complete bags are produced on each operation of the weld bar and cutting knife and no waste material is permitted to remain on the bottom of the bag below the seal. Furthermore, according to my method, the weld bar is preferably, though not necessarily, operated at a higher temperature than in the present day methods and, accordingly, the time required for the welding of the film stock is materially reduced and more rapid operation is possible since the time when the film stock is at rest after each feeding stroke thereof is considerably reduced.

According to my method, the web of tubular, thermoplastic film stock is advanced a distance equal to the length of two bags on each feeding movement of the web. During each dwell period between successive feeds of the film stock, the weld bar is operated to seal the ends of two bags simultaneously and, at the same time, to sever the film stock between the welds by the action of heat and pressure applied to the material by the weld bar. Thus, during each feed of the film stock, a double-length sleeve sealed at both ends is produced. This sleeve is cut in two by a knife which is spaced one bag length from the weld bar in the direction of travel of the tubular film stock. This knife is operated during each dwell of the film stock at the same time and in the same manner as the weld bar. Hence, two bags each sealed at one end and open at the other end are produced for each feeding stroke of the material. In this way, two complete bags are produced by my method for each advance of the film stock as compared with the single bag produced by the prior art method each time the stock is given a feeding movement. Also, according to my process, the weld produced on either edge of the cut starts at the very edge of the cut and extends inwardly therefrom so that no excess material will remain on the bag beneath the seal. Thus a considerable saving of the bag material is effected.

It is, therefore, an object of the present invention to provide a method of making bags from a web of tubular, thermoplastic film stock which is more rapid and more economical than existing methods.

A further object of the invention is to provide a method of forming bags from a web of tubular, thermoplastic film stock wherein the stock is simultaneously severed and sealed along both edges of the breach, whereafter the film stock is advanced through two bag lengths and the simultaneous severing and welding operation repeated.

A further object of my invention is to provide a method of making bags from a web of tubular, thermoplastic film stock in which two complete bags are made on each feed of the web.

Another object of my invention is to provide a method of making bags of thermoplastic material in which the material is heat-sealed by a weld bar operated at a temperature of from 500 to 600° F. and held in contact with the bag material for approximately 100 to 150 milliseconds.

A further object of the invention is to provide a method of making bags from a web of tubular, thermoplastic film stock wherein the film stock is simultaneously severed and welded along both edges of the breach and simultaneously cut at a position along the length of the web spaced from the first-mentioned breach by a distance equal to the length of a bag.

With these and other objects in view which will become apparent from the following description, the invention includes certain other novel procedures, the essential features of which are set forth in the appended claims and the important elements of which will hereinafter be described with reference to the drawings which accompany and form a part of this specification.

In the drawings:

Fig. 1 is a schematic view of one possible form of apparatus which may be used for carrying out my process.

Fig. 2 is an enlarged, fragmentary view of the weld bar shown in Fig. 1.

My novel method of producing bags from tubular, thermoplastic film stock involves the simultaneous severing and welding of the adjacent edges of the parted film stock at spaced-apart locations along the length of the continuous web of stock. The spacing between the severances is equal to the length of two bags. There will thereby be produced a plurality of pieces of tubular film stock welded at both ends. These double-welded pieces of film stock are then cut by a knife either midway between the welded ends thereof so as to produce two bags of equal length, or, if it is desired to produce two bags of different lengths, the cut may be made off center so that one bag will be longer than the other. To speed up the process and facilitate the rapid production of bags, I prefer to perform the cutting of the double-welded pieces of film stock simultaneously with the combined severing and welding operation previously mentioned so that the process becomes a continuous one in which, as each double-welded piece of film stock is produced, it is cut intermediate its ends to provide two bags of the desired lengths.

To further speed up the process and improve the combined severing and welding operation, I prefer that the bar or other device used for the combined parting and welding operation shall be operated at a temperature in the neighborhood of from 500 to 600° F., which is considerably in excess of temperatures normally used in connection with present day processes. The time interval during which the weld bar is held in contact with the film stock will, of course, vary with the nature of the material used, and should be in the neighborhood of from 100 to 150 milliseconds when using a thermoplastic material such as polyethylene resin.

In the apparatus represented in Fig. 1, which represents but one of a number of possible arrangements for assisting the artisan in carrying out my novel process, reference numeral 10 designates a supply roll from which a web 11 of tubular, thermoplastic film stock may be drawn and fed through the apparatus. The material most commonly used today for making plastic bags is polyethylene resin which is obtainable in the form of extruded tubing of varying widths and wall thicknesses so that it forms a very convenient starting material for the manufacture of plastic bags. My method, however, is not limited to any particular thermoplastic material but may be practiced with any type of tubular, thermoplastic film stock which is capable of being welded by the application of heat and pressure.

After being taken from the supply roll 10, the web 11 is passed between a first pair of feed rolls 12 and 13 which are made of resilient material such as natural or synthetic rubber. Thereafter the web 11 is passed over a platen roll 14 which is preferably formed of a heat resisting, resilient material such as silicone rubber which is a synthetic material having molecules formed of long chains of silicon-oxygen units with two methyl groups attached to each silicon atom. Disposed immediately above the roll 14 is a weld bar 15 which is preferably formed of a light metal having high heat conductivity such as aluminum or some alloy thereof. This bar is heated to a temperature preferably, though not necessarily, of from 500 to 600° F. by an electrical resistance element, or the like. As shown in Fig. 2, the weld bar 15 is provided along its lower edge with a narrow rib or tenon 16 which is connected with the body of the weld bar by a pair of inclined shoulders 17 located one on either side of the tenon. Consequently, when the heated weld bar is brough down upon the web of thermoplastic film stock passing over the resilient roll 14, the tenon 16 will, because of the heated condition thereof and the pressure applied thereto, pass through the film stock and sink into the resilient roll. The inclined shoulders 17 will press the severed edges of the film stock, on either side of the breach, against the surface of the resilient roll and, by the application of heat and pressure, cause the top and bottom plies of the stock to be welded together. This weld is quite narrow in comparison with the welds usually produced by apparatus of conventional design, the weld made according to my method preferably being of the order of 1/32 inch wide. On the other hand, however, it does provide a jointure of the plies over a substantial area and, in this respect, differs materially from the hot knife type of weld in which only the extreme ends of the plies are welded together in what amounts essentially to a line weld. For this reason, I prefer to distinguish my form of weld from the hot knife, or line weld, by referring to it as a "ribbon" weld which connotes the idea of a weld having a finite width. Due to the inclination of the shoulders 17, the pressure thereof against the film stock will be reduced toward the inner edge of the weld thereby preventing the formation of a brittle edge along the inner boundary of the seam. While the upper and lower plies of the tubular film stock are thus being pressed together and welded, the adjacent, severed edges of the material which lie against and in contact with the sides of the tenon 16 are simultaneously being softened and melted so as to produce a strong end weld along both edges of the film stock.

Beyond the weld bar, the web 11 passes between a second pair of feed rolls 20 and 21 which, like the feed rolls 12 and 13 are formed of a resilient material such as rubber. Beyond the second pair of feed rolls, the film stock is supported on a transfer belt 22 which runs over a series of pulleys 23. The transfer belt 22 supports the film stock beneath a cut-off knife 24 which cooperates with a shear bar 25 to cut the film stock. Lying beyond the right-hand end of the transfer belt 22 is a table 26 on which is inscribed an index 27 for a purpose hereinafter to be described. The cut-off knife is spaced from the weld bar 15 by a distance equal to one bag length and is also spaced one bag length from the index 27 so that when the knife is actuated to cut the web of film stock it will cut it intermediate the welded end located at the index and the welded end being formed by the weld bar so as to thereby form two bags.

The feed rolls 12—13 and 20—21 are geared together for conjoint rotation by intermeshing spur gears 30 secured to the ends of the shafts carrying the rolls. The shaft supporting the feed roll 12 also carries a larger spur gear 31 which meshes with a spur gear 32 secured to the shaft supporting the resilient roll 14. Meshing with the spur gear 32 is a spur gear 33 corresponding to the spur gear 31, the gear 33 being secured to the shaft on which the feed roll 20 is supported. Meshing with the spur gear 33 is a gear 34 which is secured to the end of the shaft supporting the upper left-hand belt pulley 23. Rotation of the feed rolls 12—13, 20—21, resilient roll 14 and the upper left-hand belt pulley 23 is effected by means of a hand crank 35 which is secured to the shaft supporting the feed roll 13. By rotating the hand crank 35 in clockwise direction, both pairs of feed rolls, the resilient roll 14 and the transfer belt 22 will all be operated to effect movement of the film stock 11 toward the right as viewed in Fig. 1.

The weld bar 15 and cut-off knife 24 are both mounted for substantially vertical reciprocatory movement and both are arranged to be given downward movement by depression of a foot stirrup 40. The stirrup is pivotally connected to the center of a cross-link 41 which, at its ends, is pivotally connected to the lower ends of operating rods 42 and 43 for the weld bar 15 and cut-off knife 24, respectively. The rods 42 and 43 are both provided with a return spring 44 for restoring the weld bar and cut-off knife to their elevated positions after pressure on the foot stirrup 40 is removed. At their upper ends the rods 42 and 43 are suitably connected to the weld bar 15 and cut-off knife 24. Hence, it will be seen that by depressing the foot stirrup 40, the weld bar 15 will be moved down against the thermoplastic film stock passing therebeneath and the lower edge of the weld bar will be pressed into the yielding surface provided by the roll 14.

At the same time, the knife 24 will be brought down and, by cooperation with the shear bar 25, will cause the film stock to be cut in two.

My novel method of making thermoplastic bags sealed at one end and open at the other end using the apparatus illustrated in Fig. 1 is as follows:

The web 11 of thermoplastic film stock is taken from the roll 10 and fed between the first pair of feed rolls 12—13 by rotation of the hand crank 35 until the end of the web is beyond the lower edge of the weld bar 15. The weld bar, preferably being heated to a temperature of 500 to 600° F., is then brought down against the film stock by depression of the foot stirrup 40 and held thereagainst for approximately a tenth of a second after which it is released and permitted to be restored upwardly by the compression spring 44. This causes the web of thermoplastic film stock to be welded along its right-hand edge to provide a sealed end thereon, the small scrap of film stock projecting beyond the weld bar being severed from the web and discarded. The hand crank 35 is then revolved to advance the film stock through a distance equal to two bag lengths and to bring the previously sealed end of the web edge of the film stock into alignment with the index 27. The foot stirrup 40 is again depressed and held for approximately one-tenth of a second after which it is released, thereby causing the weld bar 15 to sever the web of film stock due to the action of the tenon 16 pressing into the resilient roll 14 and, simultaneously, to provide a weld along each edge of the film stock by the action of the inclined shoulders 17. At the same time the cut-off knife 24 will sever the double-welded piece of film stock intermediate its welded ends so as to provide two completed bags each sealed at one end and open at the other. The hand crank 35 is again rotated clockwise until the welded edge of the film stock which was beneath the weld bar is brought opposite the index 27 and the two finished bags are ejected from the right-hand end of the belt. The foot stirrup 40 is then depressed and held for one-tenth of a second after which it is released, thereby causing the weld bar to again sever the web of film stock and seal both edges thereof. At the same time, the cut-off knife 24 will cut the double-welded piece of film stock so as to again produce two completed plastic bags sealed at one end and open at the other. This procedure is repeated, two completed bags being produced on each operation of the foot stirrup 40 and hand crank 35, until the desired quantity of plastic bags has been produced.

From the foregoing description of the novel method which I have devised for producing bags of thermoplastic material, it will be observed that by severing the web of thermoplastic material and simultaneously sealing both edges of the cut at locations two bag lengths apart, and simultaneously cutting the double-welded piece of film stock between the welded ends thereof, I am able to produce plastic bags sealed at one end and open at the other end at double the rate obtainable using conventional methods in which a single weld is made and the film stock advanced one bag length on each feeding operation of the material. The operation may also be speeded up by heating the weld bar to a temperature of from 500 to 600° F. whereby the weld time is materially reduced, it being unnecessary for the operator to hold down the foot stirrup 40 for any appreciable length of time in order to provide a suitable weld along the edges of the severed film material. All the operator needs do is give the stirrup a sharp downward thrust and allow it to immediately return under the influence of the compression springs 44 in order to provide the 100 to 150 millisecond engagement of the shoulders 17 with the edges of the thermoplastic film stock.

From the foregoing description of my method and the apparatus disclosed herein for carrying out my novel method of making bags from tubular, thermoplastic film stock, the advantages of my new and improved procedure for making plastic bags is quickly appreciated though it is to be realized, of course, that the method could be carried out by other forms of apparatus, or by hand, if desired.

Having thus described my invention, what I claim as new and useful, and desire to secure by United States Letters Patent is:

1. The method of making bags from a web of tubular, thermoplastic film stock comprising the steps of severing the web transversely of its length and simultaneously sealing the parted edges of the film stock at two spaced-apart locations along the length of the web, and cutting the film stock intermediate said two locations to form two bags each having one end sealed and the other end open.

2. The method of making a bag from a web of tubular, thermoplastic film stock comprising the steps of severing the web transversely of its length and sealing the film stock along both edges of the severance, and simultaneously cutting the web transversely of its length at a position spaced along the length of the web from the first-mentioned severance by a distance equal to the length of a bag, thereby forming a bag of plastic film having one end open and one end closed.

3. The method of making bags from a web of tubular, thermoplastic film stock comprising the steps of simultaneously severing the web transversely of its length and sealing the film stock along both edges of the severance, advancing the web through a distance of two bag lengths, again simultaneously severing the web transversely of its length and sealing the film stock along both edges of the severance, and cutting the web intermediate the two severances to form two bags each having one end sealed and one end open.

4. The method of making bags from a web of multi-ply, thermoplastic film stock comprising the steps of severing the web transversely of its length and simultaneously applying heat and pressure to an area extending along and inwardly of both edges of the severed film stock to form welds of predetermined width along both of said edges.

5. The method of making bags from a web of tubular, thermoplastic film stock comprising the steps of intermittently feeding the web through a distance equal to the length of two bags, severing the web transversely of its length and sealing the film stock along both edges of the severance between successive feeding movements of the web, and cutting the web transversely of its length between successive feeding movements of the web, the web being cut at a distance from the first-mentioned severance equal to the length of one bag.

6. The method of claim 5 wherein the first-mentioned severing of the web and the sealing of the edges thereof are performed simultaneously.

7. The method of making bags from a web of tubular thermoplastic film stock comprising the steps of advancing a sealed end of the film stock a distance equal to the length of two bags, halting the advance of the film stock, welding the stationary film stock transversely of its length and simultaneously severing the film stock at the center of the weld to form two separate, adjacent welds, and cutting the web intermediate the length of the film stock advanced simultaneously with the welding and severing thereof to simultaneously form two bags each having one end open and one end sealed.

8. The method of making bags from a web of multi-ply thermoplastic film stock which consists in cutting the film stock transversely of its length at one position to cut off a first bag, and simultaneously therewith welding the film stock transversely of its length at another position and simultaneously severing the film stock at the center of the weld to form two separate but adjacent welds, one on the web of film stock and the other on the second bag formed therefrom simultaneously with the first bag.

9. The method of claim 4 wherein the degree of heat applied to the film stock to form the welds is from 500 to 600° F.

10. The method of claim 9 wherein the said degree of heat is applied to the film stock for a period of from 100 to 150 milliseconds.

References Cited in the file of this patent

UNITED STATES PATENTS

| | | |
|---|---|---|
| 2,125,758 | Waters | Aug. 2, 1938 |
| 2,185,647 | Penn et al. | Jan. 2, 1940 |
| 2,195,583 | Schultz et al. | Apr. 2, 1940 |
| 2,232,640 | Schwartzman | Feb. 18, 1941 |
| 2,347,439 | Shea et al. | Apr. 25, 1944 |
| 2,423,187 | Haugh | July 1, 1947 |
| 2,650,182 | Green | Aug. 25, 1953 |
| 2,652,879 | Keller et al. | Sept. 22, 1953 |